United States Patent
Lu (10) Patent No.: US 10,563,705 B2
(45) Date of Patent: Feb. 18, 2020

(54) ELECTRIC LOCK AND CLUTCH MECHANISM THEREOF

(71) Applicant: TAIWAN FU HSING INDUSTRIAL CO., LTD., Kaohsiung (TW)

(72) Inventor: Shih-Min Lu, Kaohsiung (TW)

(73) Assignee: TAIWAN FU HSING INDUSTRIAL CO., LTD., Kaohsiung (TW)

( * ) Notice: Subject to any disclaimer, the term of this patent is extended or adjusted under 35 U.S.C. 154(b) by 91 days.

(21) Appl. No.: 15/997,705

(22) Filed: Jun. 5, 2018

(65) Prior Publication Data

US 2019/0249723 A1    Aug. 15, 2019

(30) Foreign Application Priority Data

Feb. 13, 2018 (TW) .............................. 107105166 A (51) Int. Cl.
*F16D 25/06* (2006.01)
*F16D 21/06* (2006.01)
*F16D 25/063* (2006.01)

(52) U.S. Cl.
CPC ........... *F16D 25/063* (2013.01); *F16D 21/06* (2013.01); *F16D 2021/063* (2013.01)

(58) Field of Classification Search
None
See application file for complete search history.

(56) References Cited

U.S. PATENT DOCUMENTS

| 4,573,723 | A | * | 3/1986 | Morita | E05B 81/25 292/336.3 |
| 5,870,644 | A | * | 2/1999 | Naka | G03B 17/30 396/512 |
| 6,026,251 | A | * | 2/2000 | Tanaka | G03B 17/30 396/538 |
| 6,107,712 | A | * | 8/2000 | Yamamura | E05F 15/697 200/11 DA |
| 7,963,134 | B2 | | 6/2011 | Rafferty | |
| 2013/0192316 | A1 | | 8/2013 | McKibben | |

FOREIGN PATENT DOCUMENTS

| CN | 206487237 U | 9/2017 |
| TW | M362278 U1 | 8/2009 |
| TW | I335374 | 1/2011 |
| TW | I593866 B | 8/2017 |

* cited by examiner

*Primary Examiner* — Colby M Hansen
(74) *Attorney, Agent, or Firm* — Winston Hsu (57) ABSTRACT

An electric lock includes a cover, a clutch rod, a driving module, a clutch member and a handle. The clutch rod is movably connected to a latch. The driving module is disposed on the cover. The driving module includes a driving member abutting against and rotatable relative to the cover, and a motor configured to drive the driving member to rotate. The handle is connected to the clutch member. Wherein, when the motor drives the driving member to rotate relative to the cover along a first rotating direction, the driving member drives the clutch rod to move toward the handle to be engaged with the clutch member for allowing the handle to drive the latch to move through the clutch rod when the handle is rotated.

16 Claims, 8 Drawing Sheets

ELECTRIC LOCK AND CLUTCH MECHANISM THEREOF

BACKGROUND OF THE INVENTION

1. Field of the Invention

This invention relates to an electric lock and a clutch mechanism thereof, and more particularly, to an electric lock with a concise clutch mechanism for saving space.

2. Description of the Prior Art

Generally speaking, an electric lock utilizes a motor as power source and transmits torque output from the motor via a gear transmission set, so as to drive a clutch mechanism of the electric lock to move to engage with or disengage from a latch assembly. When the gear transmission set is driven by the motor to rotate in a normal direction, a pushed structure is capable of driving the clutch mechanism to be engaged with the latch assembly of the electric lock. Therefore, torque received by a handle can be transmitted to the latch assembly for allowing a user to open a door by swiveling of the handle. When the gear transmission set is driven by the motor to rotate in a reverse direction opposite to the normal direction, the clutch mechanism can be disengaged from the latch assembly of the electric lock by a spring. Therefore, when the torque is exerted on the handle, the handle is idling and not able to transmit the torque to the latch assembly. Thereby, the latch assembly is able to be retained in a locked state. However, the clutch mechanism and the gear transmission set of the conventional electric lock have complex structures and large volume, resulting in incapability of effective space saving for the clutch mechanism and the gear transmission set of the conventional electric lock.

SUMMARY OF THE INVENTION

The present invention provides an electric lock and a clutch mechanism thereof for solving above drawbacks.

The electric lock includes a cover, a clutch rod, a driving module, a clutch member and a first handle. The clutch rod is configured to be movably connected to a latch. A first engaging structure is disposed on one end of the clutch rod. The driving module is disposed on the cover. The driving module includes a driving member and a motor. The driving member abuts against the cover and is rotatable relative to the cover. The motor is configured to drive the driving member to rotate. The clutch member has a second engaging structure. The first handle is connected to the clutch member. When the motor drives the driving member to rotate relative to the cover along a first rotating direction, the driving member drives the clutch rod to move toward the first handle, such that the first engaging structure is engaged with the second engaging structure for allowing the first handle to drive the clutch rod to rotate when the first handle is swiveled, so as to move the latch.

The clutch mechanism includes a cover, a clutch rod and a driving module. The clutch rod is configured to be movably connected to a latch and drive the latch to move when the clutch rod is rotated. The driving module is disposed on the cover. The driving module includes a driving member and a motor. The driving member abuts against the cover and is rotatable relative to the cover. The motor is configured to drive the driving member to rotate. When the motor drives the driving member to rotate relative to the cover along a first rotating direction, the driving member drives the clutch rod to move relative to the latch along a first direction.

In summary, the clutch mechanism of the electric lock of the present invention utilizes the motor for driving the driving member to rotate relative to the cover, so as to make a cam surface of the driving member ascend or descend relative to a cam surface of the cover, and further move the clutch rod close to or away from the first handle. Accordingly, the electric lock is controlled to be in a locked state or in an unlocked state. In such a manner, the clutch mechanism of the electric lock is concise. Moreover, the clutch mechanism of the electric lock of the present invention drives the clutch rod to move relative to the latch. Accordingly, the clutch mechanism of the electric lock of the present invention is able to transmit force exerted on the first handle to the latch through the clutch rod more directly, so as to increase reliability of the electric lock. Besides, the clutch mechanism of the electric lock is disposed between the first base and the second base. That is, the clutch mechanism can be disposed in the door, resulting in effective space saving of the electric lock of the present invention.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
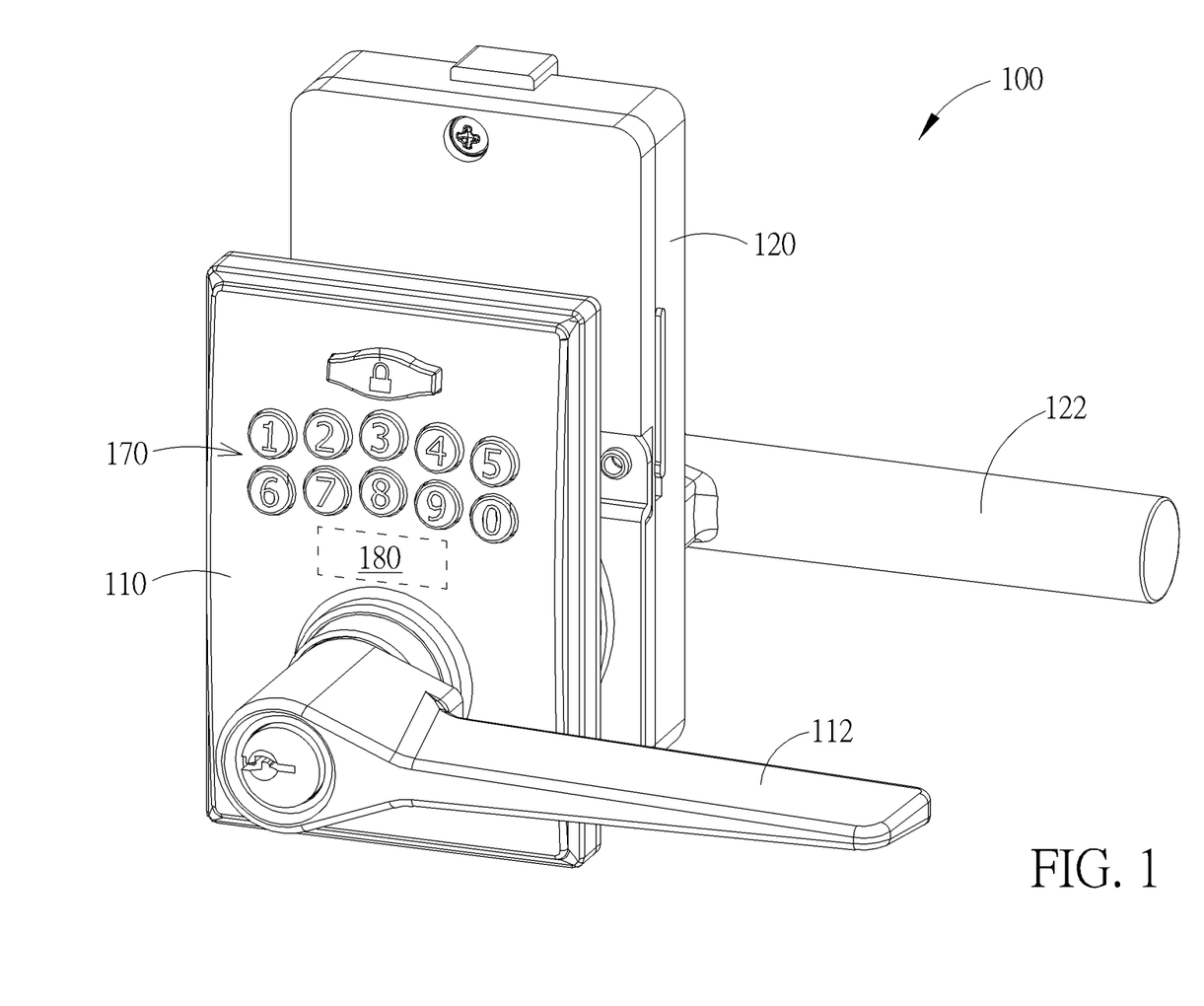
FIG. 1 is a schematic diagram of an electric lock of the present invention.
Figure 2:
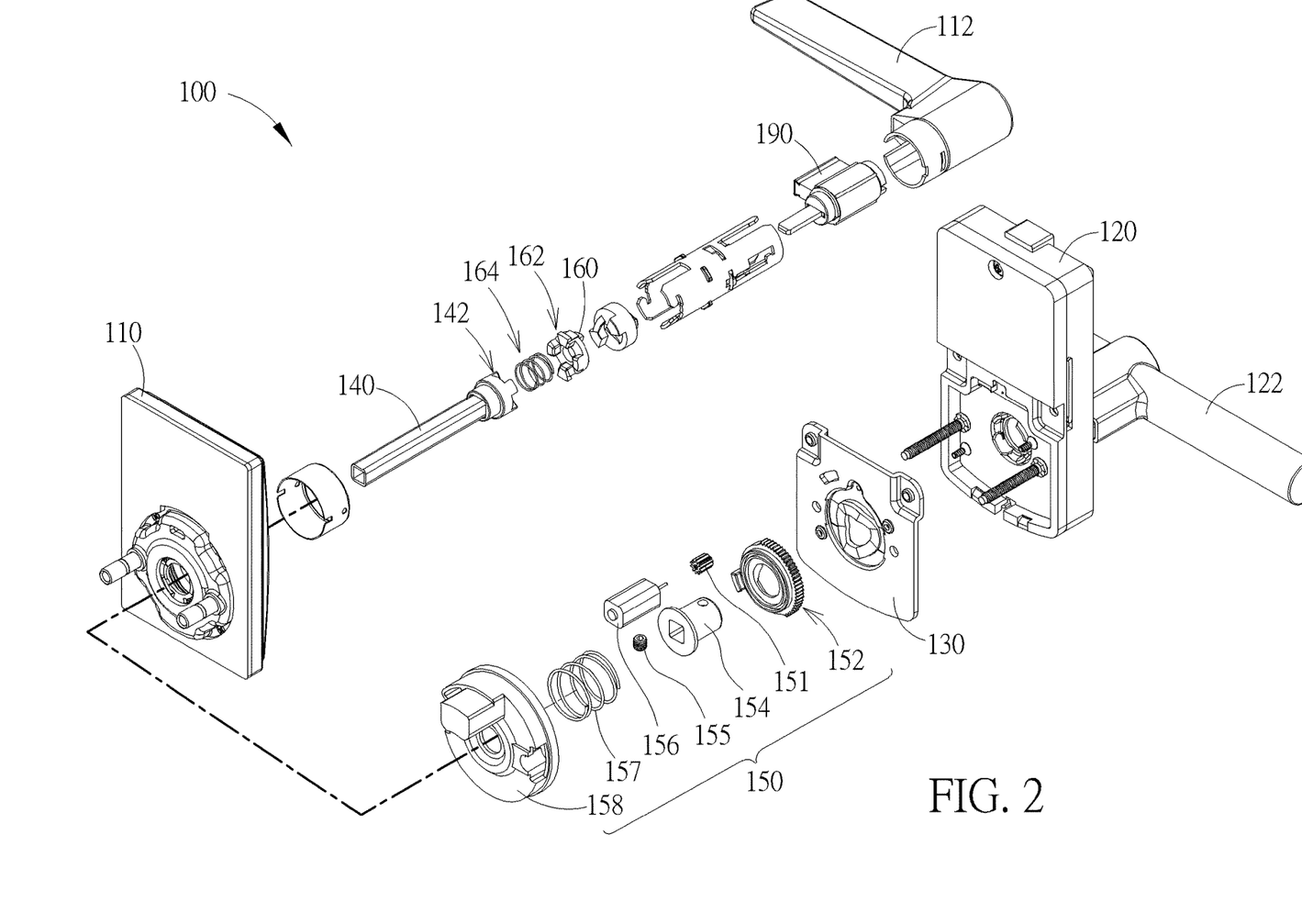
FIG. 2 is an exploded diagram of the electric lock.

Please refer to FIG. 1 and FIG. 2. FIG. 1 is a schematic diagram of an electric lock of the present invention. FIG. 2 is an exploded diagram of the electric lock. As shown in figures, the electric lock 100 includes a first base 110, a second base 120, a first handle 112, a second handle 122, a cover 130, a clutch rod 140, a driving module 150, a clutch member 160, an input interface 170 and a control unit 180. The electric lock 100 can be fixed on a door (not shown in figures) to control movement of a latch mounted on the door. The first base 110 is configured to be disposed on a first side of the door. The first handle 112 is mounted on the first base 110 in a rotatable manner. The second base 120 is configured to be disposed on a second side of the door, wherein the second side of the door is opposite to the first side of the door. The second handle 122 is mounted on the second base 120 in a rotatable manner. The cover 130 is mounted on the second base 120. The clutch rod 140 is configured to be movably connected to the latch mounted on the door, and a first engaging structure 142 is disposed on one end of the clutch rod 140. The driving module 150 is disposed on the cover 130 and configured to drive the clutch rod 140 to move. The driving module 150 includes a driving member 152, a connecting member 154 and a motor 156. The driving member 152 is rotatable relative to the cover 130. The connecting member 154 is connected to the clutch rod 140 through a fixing member 155, and the connecting member 154 abuts against the driving member 152. The motor 156 is configured to drive the driving member 152 to rotate. The clutch member 160 has a second engaging structure 162. The first handle 112 is connected to the clutch member 160 through related components. The input interface 170 is configured to receive an input data. In this embodiment, the input interface 170 is a numerical keyboard, which is configured to receive a password which the user inputs, but the present invention is not limited thereto. In other embodiments, the input interface 170 can be a touch panel or input devices of other types. The control unit 180 is electrically connected to the input interface 170 and the motor 156, and configured to activate the motor 156 when the input data matches a pre-determined data. For example, when the password which the user inputs matches a pre-determined password, the control unit 180 activates the motor 156 to drive the related components of the electric lock 100, such that the electric lock 100 is in an unlocked state (or a locked state).

On the other hand, the electric lock 100 can further include a lock core 190, and the lock core 190 is disposed on the first handle 112. When the lock core 190 is driven by a key, the lock core 190 drives the clutch rod 140 to rotate, so as to drive the latch to move. As such, when the electric lock 100 is out of electricity, the user can still use the key to execute a lock operation or an unlock operation.

Figure 3:
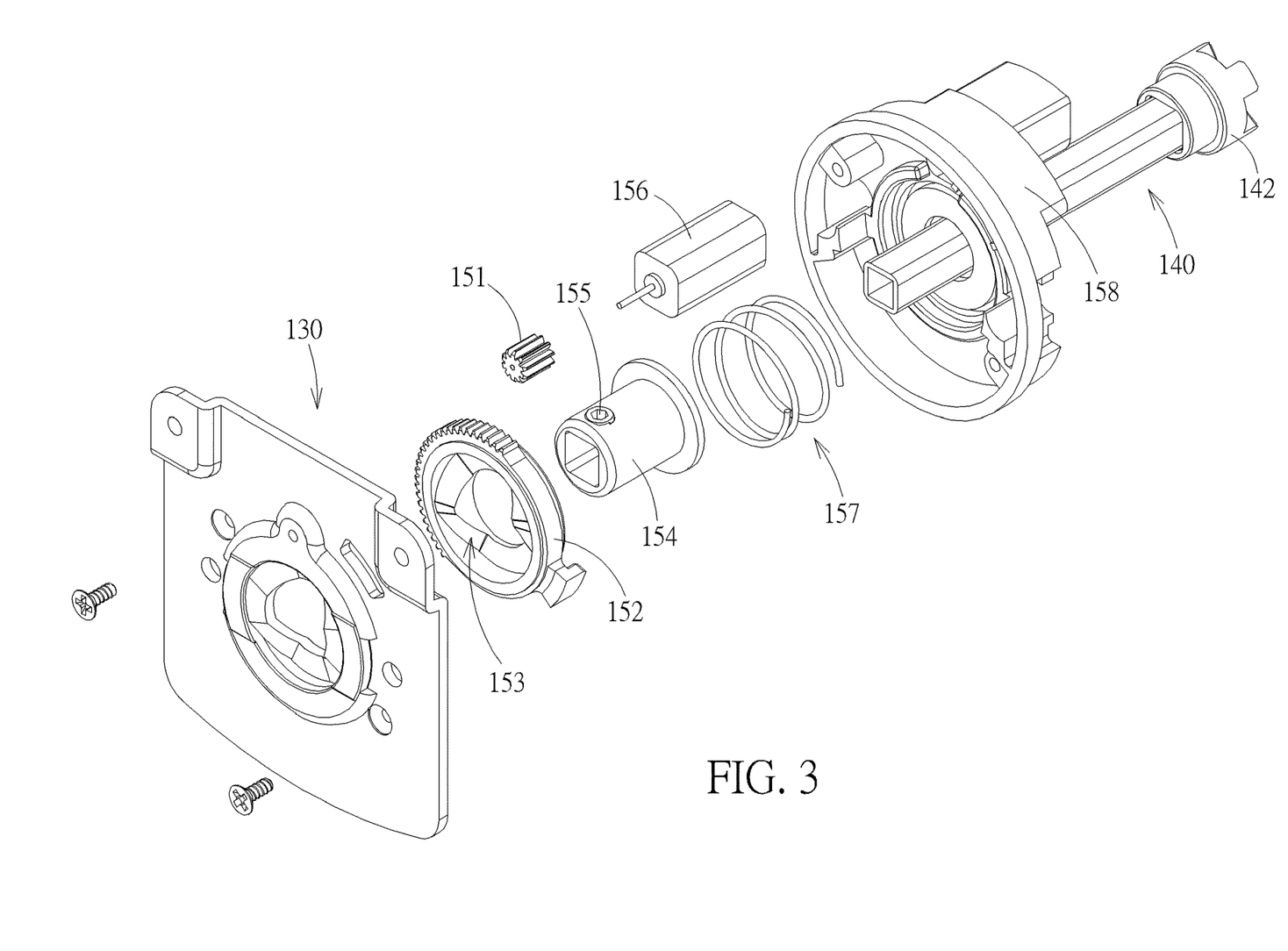
FIG. 3 is an exploded diagram of a clutch mechanism of the electric lock.
Figure 4:
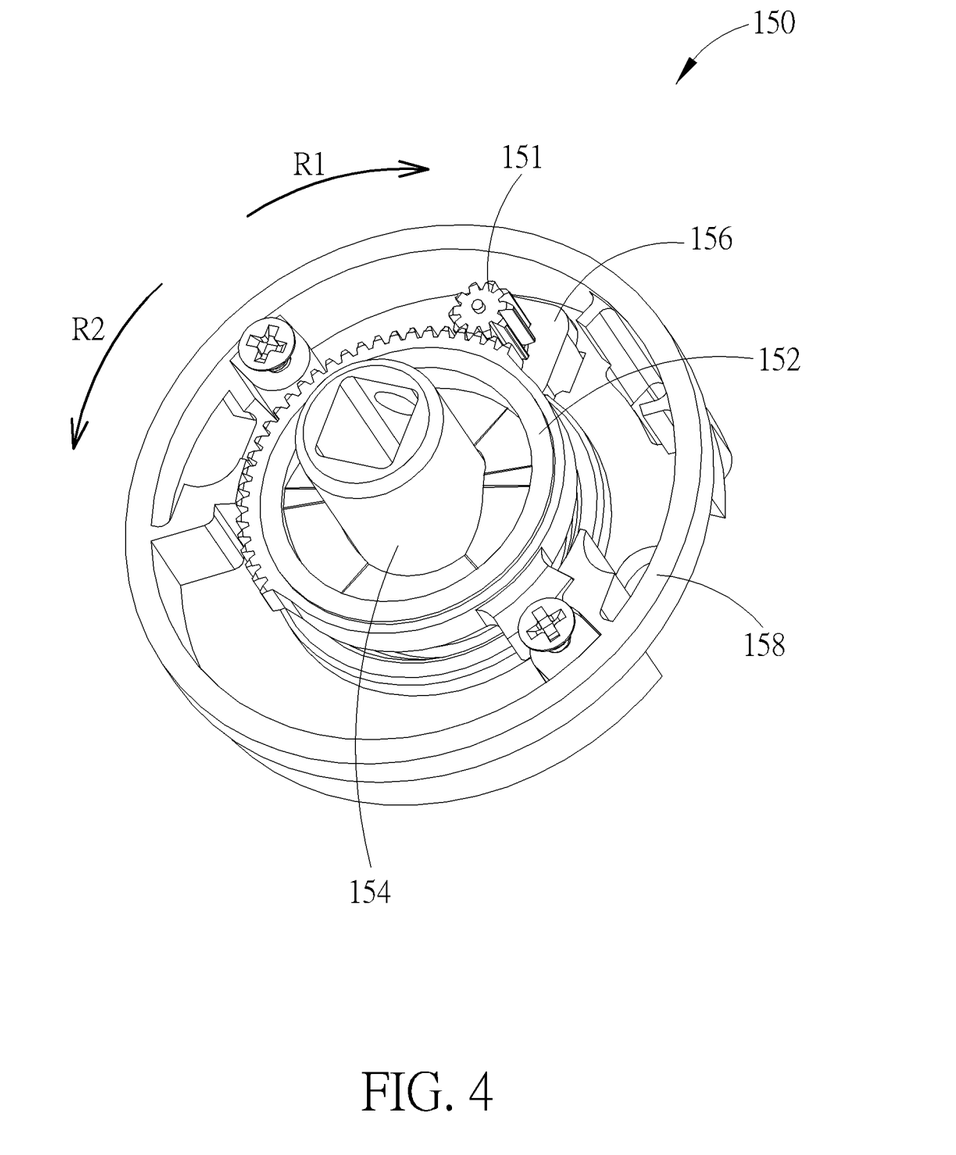
FIG. 4 is a diagram of a driving module of the electric lock.
Figure 5:
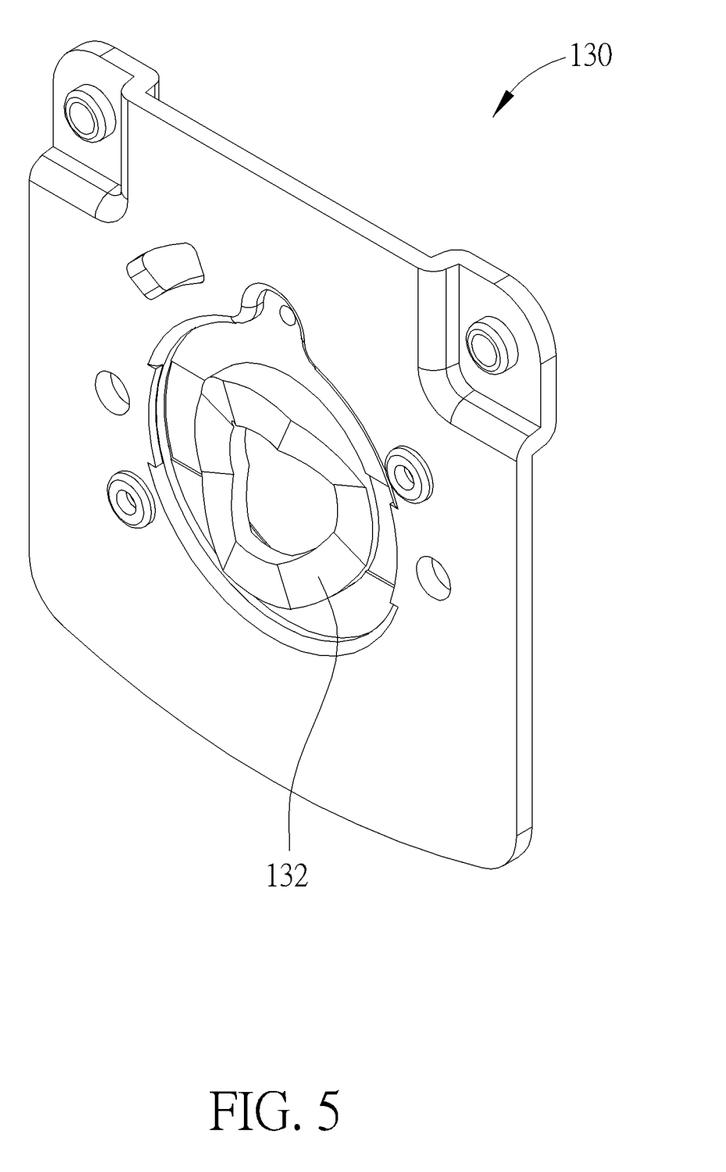
FIG. 5 is a diagram of a cover of the electric lock.

Please refer to the FIG. 3 to FIG. 5. FIG. 3 is an exploded diagram of the clutch mechanism of the electric lock. FIG. 4 is a diagram of the driving module of the electric lock. FIG. 5 is a diagram of the cover of the electric lock. As shown in figures, the clutch mechanism of the electric lock 100 includes the cover 130, the clutch rod 140 and the driving module 150. The cover 130 has a first cam surface 132. The driving member 152 of the driving module 150 has a second cam surface 153, and the second cam surface 153 abuts against the first cam surface 132. The driving module 150 further comprises a transmission member 151, and the transmission member 151 abuts against the driving member 152, wherein the transmission member 151 is configured to transmit power generated by the motor 156 to the driving member 152. In this embodiment, the transmission member 151 and the driving member 152 are gears, but the invention is not limited thereto. The present invention can use alternative structures to drive the driving member 152 to rotate. Furthermore, the driving module 150 further includes a mounting base 158 and a resilient member 157. The mounting base 158 is configured to accommodate the driving member 152 and the motor 156, and the resilient member 157 is disposed between the driving member 152 and the mounting base 158. When the motor 156 drives the driving member 152 to rotate relative to the cover 130 through the transmission member 151, the second cam surface 153 of the driving member 152 moves relative to the first cam surface 132 of the cover 130, which allows the driving member 152 to move relative to the cover 130 (and the transmission member 151) along a rotation axis of the driving member 152, such that the connecting member 154 activates the clutch rod 140 to move close to or away from the first handle 112.

Figure 6:
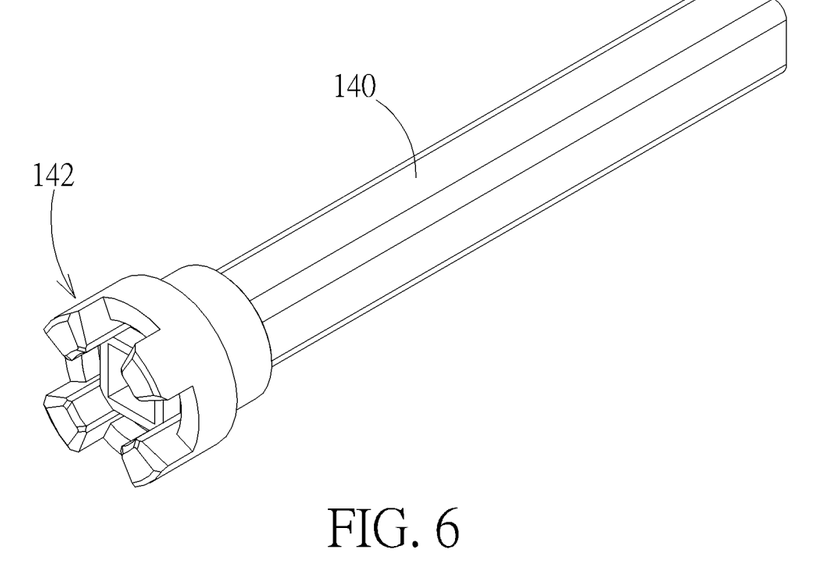
FIG. 6 is a diagram of a clutch rod of the electric lock.
Figure 7:
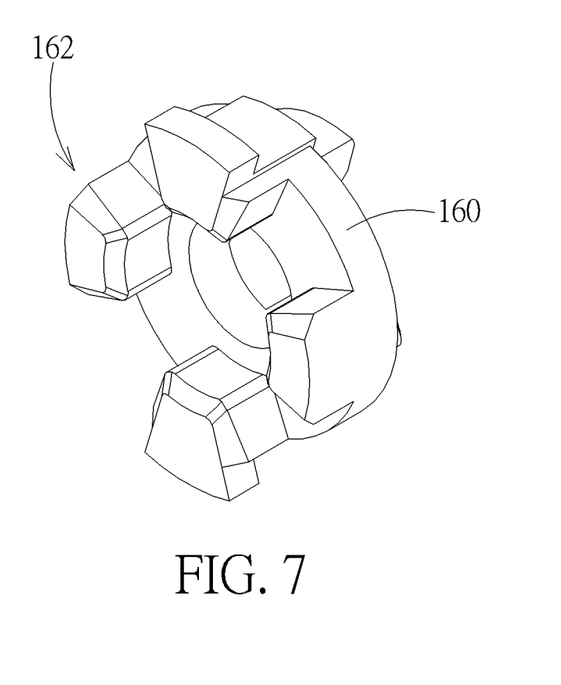
FIG. 7 is a diagram of a clutch member of the electric lock.

Please refer to FIG. 6 and FIG. 7. FIG. 6 is a diagram of the clutch rod of the electric lock. FIG. 7 is a diagram of the clutch member of the electric lock. As shown in figures, a shape of the first engaging structure 142 of the clutch rod 140 is corresponding to a shape of the second clutch structure 162 of the clutch member 160. When the first engaging structure 142 is engaged with the second engaging structure 162, the clutch rod 140 is able to rotate with the clutch member 160.

Figure 8:
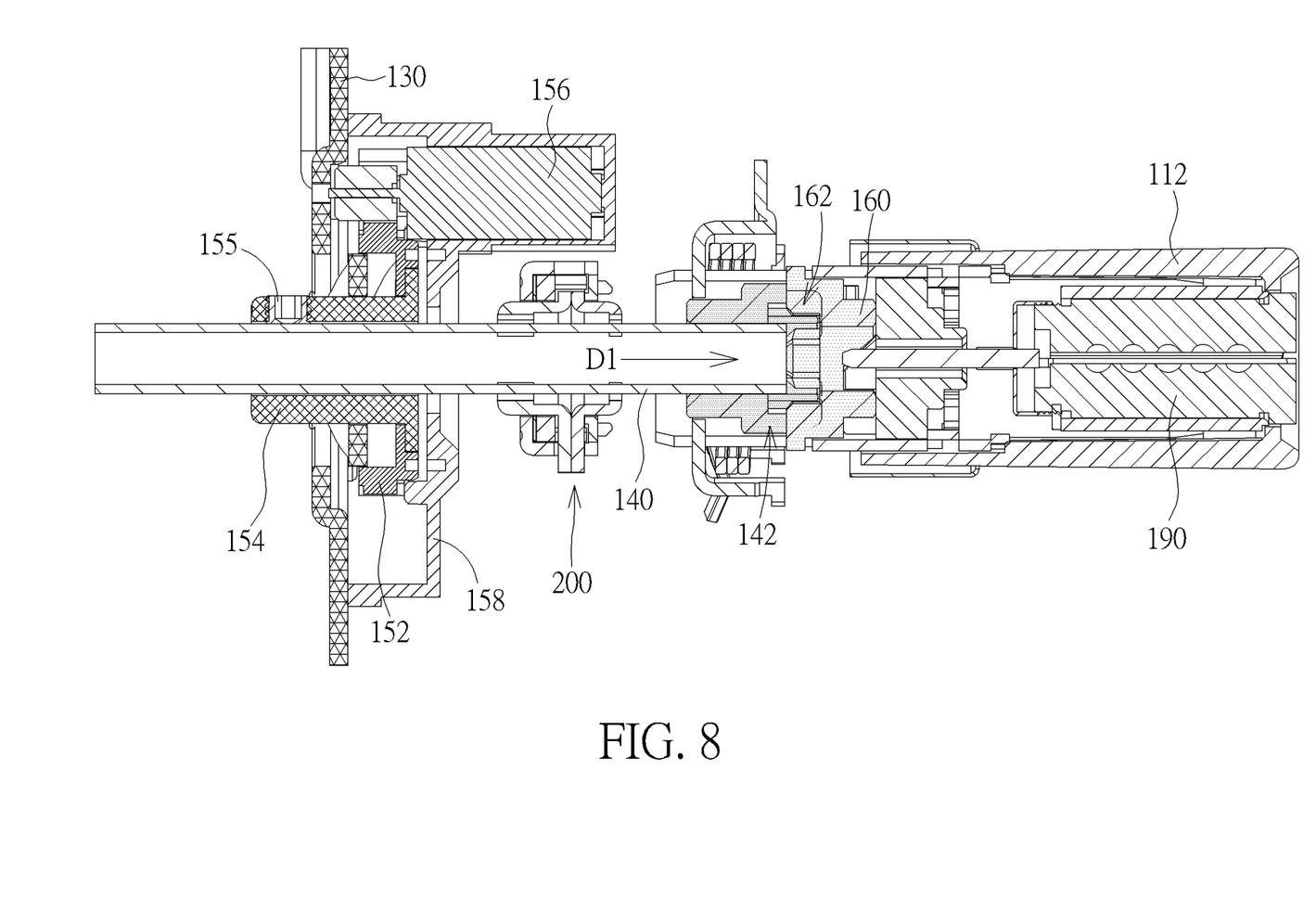
FIG. 8 is a diagram of the electric lock in an unlocked state.

Please refer to FIG. 8. FIG. 8 is a diagram of the electric lock in an unlocked state. For ease of understanding, several components of the electric lock 100 are omitted in FIG. 8, and the components omitted in FIG. 8 can be referred in FIG. 1 to FIG. 7. As shown in figure, when the input interface 170 is utilized for controlling the electric lock 100 to execute an unlock operation by the user (e.g., when the data which the user inputs matches a pre-determined unlock data), the control unit 180 controls the motor 156 to drive the driving member 152 to rotate relative to the cover 130 along a first rotating direction R1. When the driving member 152 is rotated relative to the cover 130 along the first rotating direction R1, the second cam surface 153 of the driving member 152 ascends relative to the first cam surface 132 of the cover 130, so as to drive the driving member 152 to move close to the first handle 112 along the rotation axis of the driving member 152 (i.e., the driving member 152 is moved along the first direction D1). In addition, the driving member 152 further drives the clutch rod 140 to move close to the first handle 112 via the connecting member 154, such that the first engaging structure 142 of the clutch rod 140 is engaged with the second engaging structure 162 of the clutch member 160. As such, when the user swivels the first handle 112, the first handle 112 can drive the clutch rod 140 to rotate through the clutch member 160. Correspondingly, the clutch rod 140 further drives the latch 200, such that the latch 200 is moved from a lock position to a unlock position.

Figure 9:
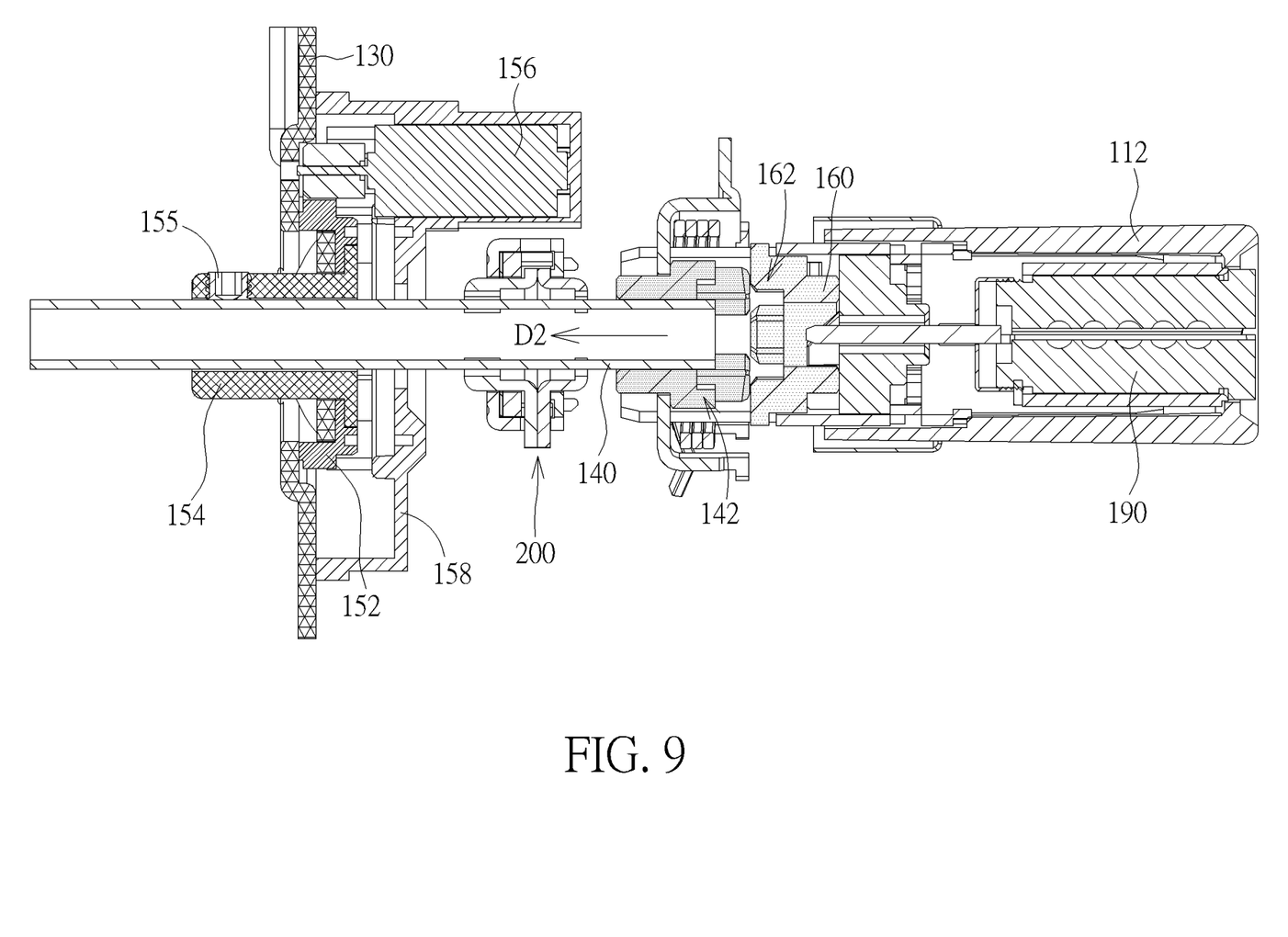
FIG. 9 is a diagram of the electric lock in a locked state.

Please refer to FIG. 9. FIG. 9 is a diagram of the electric lock in a locked state. For ease of understanding, several components of the electric lock 100 are omitted in FIG. 9. The components omitted in FIG. 9 can be referred in FIG. 1 to FIG. 7. As shown in figure, when the input interface 170 is utilized for controlling the electric lock 100 to execute a lock operation by the user (e.g., when the data which the user inputs matches a pre-determined lock data), the control unit 180 controls the motor 156 to drive the driving member 152 to rotate relative to the cover 130 along a second rotating direction R2. When the driving member 152 is rotated relative to the cover 130 along the second rotating direction R2, the second cam surface 153 of the driving member 152 descends relative to the first cam surface 132 of the cover 130, so as to drive the driving member 152 to move away from the first handle 112 along the rotation axis of the driving member 152 (i.e., the driving member 152 is moved along the second direction D2). In addition, the resilient member 157 drives the driving member 152 to move away from the first handle 112 (or move toward the cover 130), such that the first engaging structure 142 of the clutch rod 140 is disengaged from the second engaging structure 162 of the clutch member 160. As such, when the user swivels the first handle 112, the first handle 112 no longer drives the clutch rod 140 to rotate via the clutch member 160, and thus becomes idle. In other words, the clutch rod 140 is not driven by the first handle 112 to move the latch 200 from the lock position to the unlock position. In addition, the electric lock 100 of the present invention can further include an elastic member 164, and the elastic member 164 is disposed between the first engaging structure 142 and the second engaging structure 162. When the driving member 152 rotates relative to the cover 130 along the second rotating direction R2, the elastic member 164 drives the clutch rod 140 to move away from the first handle 112.

Compared to the prior art, the clutch mechanism of the electric lock of the present invention utilizes the motor for driving the driving member to rotate relative to the cover, so as to make a cam surface of the driving member ascend or descend relative to a cam surface of the cover, and further move the clutch rod close to or away from the first handle. Accordingly, the electric lock is controlled to be in a lock state or in an unlock state. In such a manner, the clutch mechanism of the electric lock is concise. Moreover, the clutch mechanism of the electric lock of the present invention drives the clutch rod to move relative to the latch. Accordingly, the clutch mechanism of the electric lock of the present invention is able to transmit force exerted on the first handle to the latch through the clutch rod more directly, so as to increase reliability of the electric lock. Besides, the clutch mechanism of the electric lock is disposed between the first base and the second base. That is, the clutch mechanism can be disposed in the door, resulting in effective space saving of the electric lock of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electric lock, comprising:
  a cover;
  a clutch rod configured to be movably connected to a latch, a first engaging structure being disposed on one end of the clutch rod;
  a driving module disposed on the cover, the driving module comprising:
    a driving member abutting against the cover and rotatable relative to the cover; and
    a motor configured to drive the driving member to rotate;
  a clutch member having a second engaging structure; and
  a first handle connected to the clutch member;
  wherein when the motor drives the driving member to rotate relative to the cover along a first rotating direction, the driving member drives the clutch rod to move toward the first handle, such that the first engaging structure is engaged with the second engaging structure for allowing the first handle to drive the clutch rod to rotate when the first handle is rotated, so as to move the latch.

2. The electric lock of claim 1, wherein when the motor drives the driving member to rotate relative to the cover along a second rotating direction, the clutch rod is moved away from the first handle, so as to disengage the first engaging structure from the second engaging structure.

3. The electric lock of claim 1, wherein the driving member is a gear, the driving module further comprises a transmission member, the transmission member abutting against the driving member and being configured to transmit power generated by the motor to the driving member, and the driving member is movable relative to the transmission member along a rotation axis of the driving member.

4. The electric lock of claim 1, further comprising a lock core disposed on the first handle, and the lock core being driven by a key, so as to drive the clutch rod to move the latch.

5. The electric lock of claim 1, further comprising:
  an input interface configured to receive an input data; and
  a control unit electrically connected to the input interface and the motor and configured to activate the motor when the input data matches a pre-determined data.

6. The electric lock of claim 1, further comprising an elastic member, the elastic member being disposed between the first engaging structure and the second engaging structure, so as to drive the clutch rod to move away from the first handle.

7. The electric lock of claim 1, further comprising:
  a first base disposed on a first side of a door, wherein the first handle is mounted on the first base in a rotatable manner;
  a second base disposed on a second side of the door, wherein the second side is opposite to the first side, and the cover is mounted on the second base; and
  a second handle mounted on the second base in a rotatable manner.

8. The electric lock of claim 1, wherein the driving module further comprises:
  a mounting base configured to accommodate the driving member and the motor; and
  a resilient member disposed between the driving member and the mounting base, the resilient member being configured to drive the clutch rod to move away from the first handle.

9. The electric lock of claim 1, wherein the driving module further comprises a connecting member, the connecting member is connected to the clutch rod and abuts against the driving member.

10. The electric lock of claim 1, wherein the cover has a first cam surface, and the driving member has a second cam surface, the second cam surface abuts against the first cam surface.

11. A clutch mechanism of an electric lock, comprising:
  a cover;
  a clutch rod configured to be movably connected to a latch and driving the latch to move when the clutch rod is rotated; and
  a driving module disposed on the cover, the driving module comprising:
    a driving member abutting against the cover and rotatable relative to the cover; and
    a motor configured to drive the driving member to rotate;
  wherein when the motor drives the driving member to rotate relative to the cover along a first rotating direction, the driving member drives the clutch rod to move relative to the latch along a first direction.

12. The clutch mechanism of claim 11, wherein when the motor drives the driving member to rotate relative to the cover along a second rotating direction, the clutch rod is moved relative to the latch along a second direction, and the second direction is opposite to the first direction.

13. The clutch mechanism of claim 11, wherein the driving member is a gear, the driving module further comprises a transmission member, the transmission member abutting against the driving member and being configured to transmit power generated by the motor to the driving member, and the driving member is movable relative to the transmission member along a rotation axis of the driving member.

14. The clutch mechanism of claim 11, wherein the driving module further comprises:
  a mounting base configured to accommodate the driving member and the motor; and
  a resilient member disposed between the driving member and the mounting base, the resilient member being configured to drive the clutch rod to move relative to the latch along the second direction.

15. The clutch mechanism of claim 11, wherein the driving module further comprises a connecting member, the connecting member is connected to the clutch rod and abuts against the driving member.

16. The clutch mechanism of claim 11, wherein the cover has a first cam surface, and the driving member has a second cam surface, the second cam surface abuts against the first cam surface.

* * * * *